(12) United States Patent
Uda et al.

(10) Patent No.: US 6,477,140 B1
(45) Date of Patent: Nov. 5, 2002

(54) MULTIPLEX COMMUNICATIONS SYSTEM

(75) Inventors: Makoto Uda, Shizuoka (JP); Takehiko Uehara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/315,944

(22) Filed: May 21, 1999

(30) Foreign Application Priority Data

May 22, 1998 (JP) .......................................... 10-141625

(51) Int. Cl.[7] .............................................. G06F 13/22
(52) U.S. Cl. ........................ 370/216; 370/451; 710/109; 710/110; 709/208
(58) Field of Search ................................ 370/216, 217, 370/276, 282, 319, 357, 360, 362, 407, 449, 443, 432, 461; 340/825; 455/507; 379/142.12, 171; 701/33; 710/15–19, 109, 110; 709/208, 209, 223, 224

(56) References Cited

U.S. PATENT DOCUMENTS

| 4,715,031 A | * | 12/1987 | Crawford et al. | ........... 370/462 |
| 4,907,222 A | * | 3/1990 | Slavik | ....................... 307/10.1 |
| 4,908,822 A | * | 3/1990 | Wroblewski | ................ 340/3.1 |
| 4,967,344 A | * | 10/1990 | Scavezze et al. | .............. 714/4 |
| 5,305,316 A | * | 4/1994 | Yoshida et al. | ........ 340/310.01 |
| 5,349,255 A | * | 9/1994 | Patel | .......................... 327/141 |
| 5,404,465 A | * | 4/1995 | Novakovich et al. | ....... 710/110 |
| 5,408,227 A | * | 4/1995 | Hirabayashi et al. | ........ 340/3.1 |
| 5,592,485 A | * | 1/1997 | Consiglieri et al. | ........ 307/10.1 |
| 5,761,443 A | * | 6/1998 | Kranich | ....................... 710/100 |
| 5,809,010 A | * | 9/1998 | Bruce | ......................... 370/217 |
| 5,957,985 A | * | 9/1999 | Wong et al. | ................... 701/29 |
| 5,978,352 A | * | 11/1999 | Imaizumi et al. | ............. 307/39 |
| 6,049,741 A | * | 4/2000 | Kawamura | .................... 700/80 |
| 6,111,889 A | * | 8/2000 | Osada | ...................... 340/825.5 |
| 6,141,736 A | * | 10/2000 | Abert et al. | ................. 710/110 |
| 6,147,967 A | * | 11/2000 | Ying et al. | ................... 370/222 |
| 6,189,061 B1 | * | 2/2001 | Katz et al. | ................... 710/110 |
| 6,195,340 B1 | * | 2/2001 | Hatayama | .................... 370/319 |

OTHER PUBLICATIONS

Philips; "Application Notes and Development Tools for 80C51 Microcontrollers" 1995, pp. 335–369, 275–283.

* cited by examiner

Primary Examiner—Hassan Kizou
Assistant Examiner—David Odland
(74) Attorney, Agent, or Firm—Sughrue Mion, PLLC

(57) ABSTRACT

A multiplex communications system includes a plurality of master-slave sub-systems which include master nodes (10, 20) connected to a multiplex communications line (BL) and slave nodes (30, 40, 50) connected to the same. Each master node transmits a signal to the slave node of the same sub-system at a first given cycle, and in response the slave node transmits a signal, thereby establishing communication between the master node and the slave node. If periodic transmission of a signal at the first given cycle is not correctly carried out, the master node, which correctly performs periodic transmission of a signal, periodically transmits a signal to both the slave nodes at a second given cycle which is slightly longer than the first given cycle. If the specific two slave nodes of the master-slave sub-system does not carry out periodic transmission of a signal at the second given cycle, the master node periodically transmits a signal between the two specific slave nodes at a third given cycle, which is slightly longer than the second given cycle.

2 Claims, 6 Drawing Sheets

FIG. 5

| 15 (MSB) | 14 | 13 | 12 | | 2 | 1 | 0 (LSB) |
|---|---|---|---|---|---|---|---|
| ADDRESS 0, DATA I/O 1 REGISTER | | | | | | | |
| DIO 15 | | | | | | | DIO 0 |
| ADDRESS 1, DATA I/O 2 REGISTER | | | | | | | |
| DIO 31 | | | | | | | DIO 16 |
| ADDRESS 2, EVENT STOP 1 REGISTER | | | | | | | |
| ES 15 | | | | | | | ES 0 |
| ADDRESS 3, EVENT STOP 2 REGISTER | | | | | | | |
| ES 31 | | | | | | | ES 16 |
| ADDRESS 4, PRIOR BIT REGISTER | | | | | | | |
| | | | | | | | |
| ADDRESS 5, OUTPUT ENABLE REGISTER 1 | | | | | | | |
| OE 15 | | | | | | | OE 0 |
| ADDRESS 6, OUTPUT ENABLE REGISTER 2 | | | | | | | |
| OE 31 | | | | | | | OE 16 |
| ADDRESS 7, FILTERING TIME | | | | | | | |
| X 2 | X 1/2 | | | | | | |
| ADDRESS 8, WAKE-UP REGISTER | | | | | | | |
| W/U | | | | | | | |
| ADDRESS 9, FAIL-SAFE MODE REGISTER | | | | | | | |
| DIO 15 | DIO 14 | DIO 13 | DIO 12 | | DIO 2 | DIO 1 | DIO 0 |

FIG. 6A

| SOF | ID10 | ARBITRATION FIELD (ID) | | | | | | | | | | ID0 | |
|---|---|---|---|---|---|---|---|---|---|---|---|---|---|
| | PRIO-RITY | M-S | MA03 | MA02 | MA01 | ID05 | ID04 | ID03 | ID02 | ID01 | DIR | RTR |
| 0 | | | | | | | | | | | | |

FIG. 6B

| CONTROL FIELD DLC | | | | BYTE 1 | | | | | | | |
|---|---|---|---|---|---|---|---|---|---|---|---|
| | | | | STATUS | | | | REGISTER ADDRESS | | | |
| | | 1 | 1 | RE-MOTE | EW | BM | SLEEP | A3 | A2 | A1 | A0 |
| 0 | 0 | | | | | | | | | | |

FIG. 6C

| BYTE 2 I/O REGISTER DATA (P15 ~ P8, P31 ~ P24) | | | | | | | | BYTE 3 I/O REGISTER DATA (P7 ~ P0, P23 ~ P16) | | | | | | | |
|---|---|---|---|---|---|---|---|---|---|---|---|---|---|---|---|
| X | X | X | X | X | X | X | X | X | X | X | X | X | X | X | X |

FIG. 7A

| | ID | | | | | | | | | | |
|---|---|---|---|---|---|---|---|---|---|---|---|
| ID 10 | ID 9 | ID 8 | ID 7 | ID 6 | ID 5 | ID 4 | ID 3 | ID 2 | ID 1 | ID 0 | |
| | 0 | MA02 | MA01 | MA00 | ID 04 | ID 03 | ID 02 | ID 01 | ID 00 | 0 | RTR |

FIG. 7B

| | ID | | | | | | | | | | |
|---|---|---|---|---|---|---|---|---|---|---|---|
| ID 10 | ID 9 | ID 8 | ID 7 | ID 6 | ID 5 | ID 4 | ID 3 | ID 2 | ID 1 | ID 0 | |
| | 0 | | | | | | | | | 1 | RTR |

FIG. 7C

| | ID | | | | | | | | | | |
|---|---|---|---|---|---|---|---|---|---|---|---|
| ID 10 | ID 9 | ID 8 | ID 7 | ID 6 | ID 5 | ID 4 | ID 3 | ID 2 | ID 1 | ID 0 | |
| | 0 | | | | | | | | $\overline{\text{ID 00}}$ | 0 | RTR |

MULTIPLEX COMMUNICATIONS SYSTEM

BACKGROUND OF THE INVENTION

1. Field of the Invention

The present invention relates to a multiplex communications system in which a master node and at least two slave nodes are interconnected by way of a common multiplex communications line; i.e., a bus line. More particularly, the present invention relates to a multiplex communications system in which a master node controls all slave nodes.

The present application is based on Japanese Patent Application No. Hei. 10-141625, which is incorporated herein by reference.

2. Description of the Related Art

In the related system of this type, data can be exchanged only between a master node and a slave node. When the input level of one of the slave nodes is changed, event transmission is carried out to automatically transmit to the master node information about the change. When data are transferred to the slave node from the master node in response to event transmission, the master node transfers data by designation of the slave node, through use of a frame including the identification of the node that requires the data. In contrast, the slave node transfer data to the master node through polling. The master node periodically selects each of the slave nodes in turn. When being designated by the master node, the slave node performs data transfer operations through response transmission.

In principle, communication between the master node and the slave nodes is carried out according to one of the above two methods. Input information transferred from a slave node through polling and event transmission is collectively stored in the master node. Further, information about the output status of the slave node transferred therefrom by means of polling is also stored in the master node. When an imbalance arises between the input information and the output information, data including the input information are transferred to the slave node holding the output information corresponding to the input information to thereby cause the output information to match the input information, thus driving load according to the input information. Such a master-slave system has the merits of reducing the burden of controlling imposed on the slave node and achieving cost reduction.

In such multiplex communication, if the master node experiences a malfunction and becomes uncontrollable, all the slave nodes become inoperative.

SUMMARY OF THE INVENTION

In view of the foregoing problems, an object of the present invention is to provide a multiplex communications system which performs a backup operation corresponding to a malfunction while taking full use of the merit of multiplex communication.

According to the first aspect of the present invention, there is provided a multiplex communications system which comprises a plurality of master-slave sub-systems, each of the master-slave sub-system including one master node connected to a multiplex communications line and at least one slave node connected to the multiplex communications line, wherein the master node of each master-slave sub-system periodically transmits a signal to the slave node of the sub-system at a first given cycle, the slave node transmits a signal in response to periodic transmission of the signal from the master node, thereby establishing communication between the master node and the slave node through the multiplex communications line and exchanging data between the slave nodes, the master node of one master-slave sub-system monitors the master node of another master-slave sub-system, and is detectable that periodic transmission of a signal at the first given cycle is incorrectly carried out, wherein when the master node of the one master-slave sub-system detects that the periodic transmission of the signal at the first given cycle is incorrectly carried out, the master node, which correctly performs periodic transmission of a signal, periodically transmits a signal to both the slave nodes of both the sub-system to which the mater node belongs and another sub-system at a second given cycle which is slightly longer than the first given cycle, and specific two slave nodes of the master-slave sub-system are detectable that periodic transmission of a signal at the second given cycle is incorrectly carried out, wherein periodic transmission of a signal at a third given cycle, which is slightly longer than the second given cycle, is performed between the specific two slave nodes in response to detection in that the periodic transmission of the signal at the second given cycle is incorrectly carried out. Accordingly, even when the master node falls into malfunction, another master node can control the slave nodes as an alternative to the master node that has fallen into malfunction. Further, even if all the master nodes of the master-slave sub-systems fall into malfunction, communication between two specific slave nodes is ensured.

According to the second aspect of the present invention, preferably, the above-described multiplex communications further comprises a backup signal line disposed between the salve node which is connected to control means and serves as an input slave node and the slave node which is connected to a load to be controlled by the control means and serves as an output slave node, wherein the output slave node comprises abnormality detection means which detects an abnormality when the output slave node does not receive a transmission signal for a given time period slightly longer than the third given cycle, and backup means which enables the control means to drive a corresponding load through the backup signal line in response to detection of an abnormality by the abnormality detection means. In this configuration, when the abnormality detection means detects an abnormality from that the output slave node does not receive a transmission signal for a given time period slightly longer than the third given cycle, the backup means enables the control means to control a corresponding load by way of the backup signal line laid between the input slave node and the output slave node. Consequently, even if communication between the slave node connected to the control means and the slave node connected to a load cannot be established by way of the multiplex communications line, minimum functions can be automatically ensured.

BRIEF DESCRIPTION OF THE DRAWINGS

FIG. 5 is a table showing the map of an I/O register shown in FIG. 2;

FIGS. 6A to 6C are schematic representations showing the configuration of a data frame used in the multiplex communications system shown in FIG. 1; and FIGS. 7A to 7C are schematic representations for describing IDs used in a normal communication condition and in an abnormal communication condition.

DETAILED DESCRIPTION OF THE PREFERRED EMBODIMENT

Figure 1:
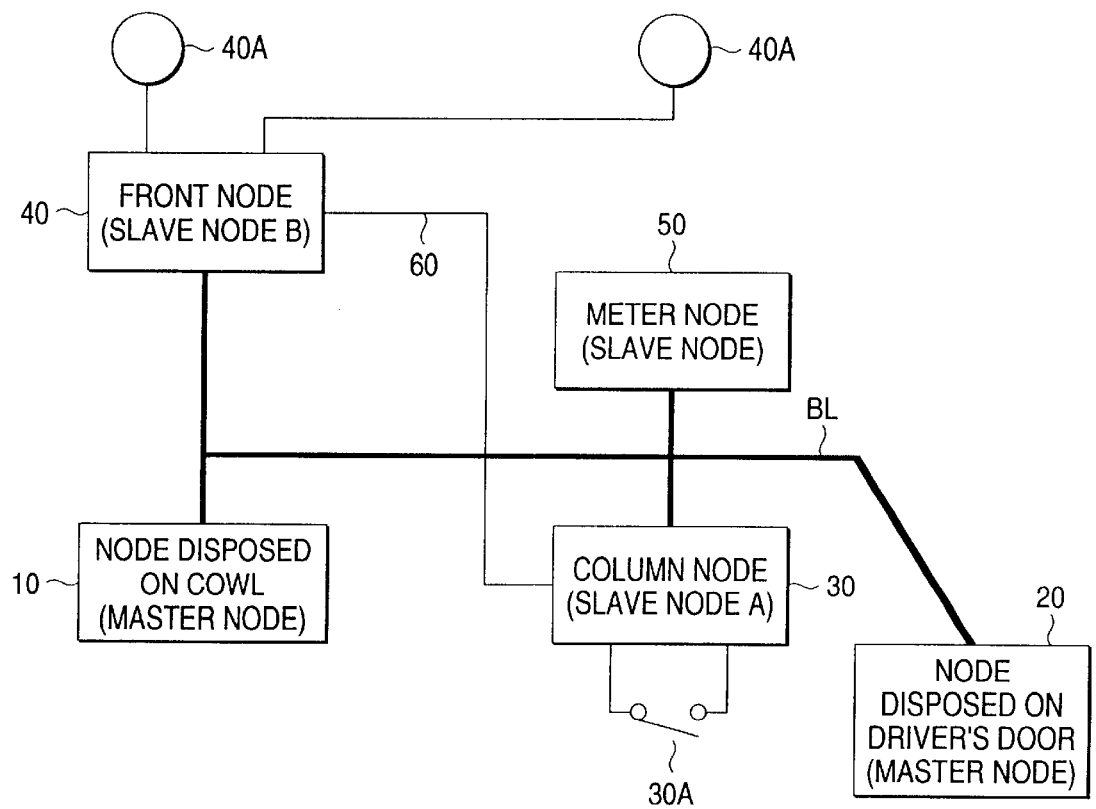
FIG. 1 is a diagram showing the configuration of a multiplex communications system according to one embodiment of the present invention which is embodied for use in multiplex communication within an on-vehicle body system.

A preferred embodiment of the present invention will be described hereinbelow by reference to the accompanying drawings. FIG. 1 is a block diagram showing the diagrammatic structure of a multiplex communications system according to the present invention which is configured for use in multiplex communication within an on-vehicle body system.

In FIG. 1, reference numeral 10 designates a node disposed on a cowl (hereinafter referred to as a "cowl node"); and reference numeral 20 designates a node disposed on a driver's door (hereinafter referred to as a "door node"); these nodes act as master nodes.

Reference numeral 30 designates a column node; 40 designates a front node; and 50 designates a meter node. The column node 30 is disposed in a handle column; the front node 40 is disposed in an engine compartment; and the meter node 50 is disposed behind an instrument panel located in the dashboard. Each of these nodes 10, 20, 30, 40, and 50 is connected to a multiplex communications line (hereinafter referred to as a "bus line BL"). The column node 30 and the front node 40 form a first master-slave sub-system in conjunction with the cowl node 10, and the meter node 50 forms a second master-slave sub-system in conjunction with the door node 20. The column node 30 acts as a slave node A and is connected to a control switch 30A. The front node 40 acts as a slave node B and is connected to headlamps 40A which are turned on or off through activation and deactivation of the control switch 30A. A backup signal line 60 is provided between the column node 30 and the front node 40.

Figure 2:
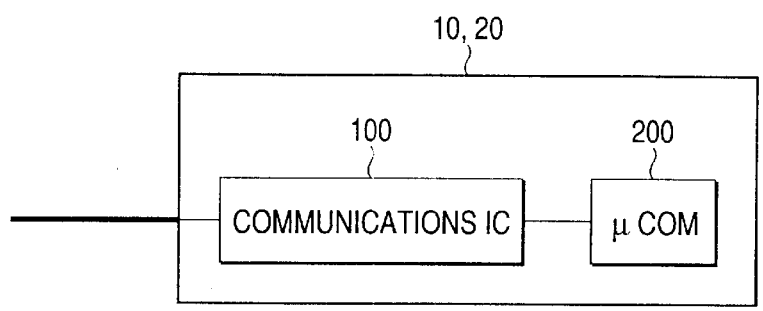
FIG. 2 is a block diagram showing the configuration of a master node shown in FIG. 1.

As shown in FIG. 2, the cowl node 10 and the door node 20, which together form the master node, comprise a built-in communications IC 100 and a built-in microcomputer 200 (designated by μCOM) which includes such as ROM and RAM. The built-in CPU controls various types of data processing operations according to a program stored in the ROM, and the RAM has a storage area for storing various status information items collected from the slave nodes.

Figure 3A:
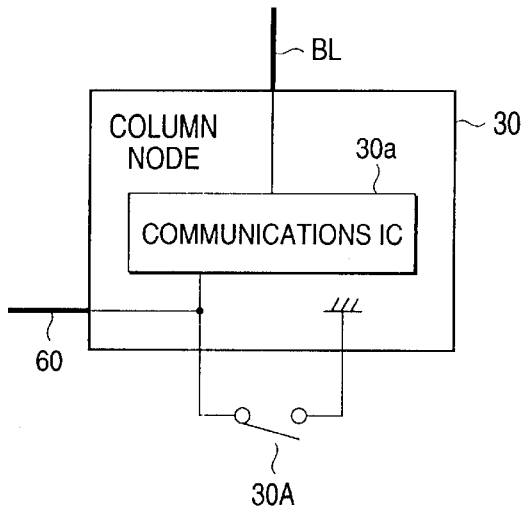
FIGS. 3A to 3C are block diagrams showing the configuration of each of slave nodes shown in FIG. 1.
Figure 3B:
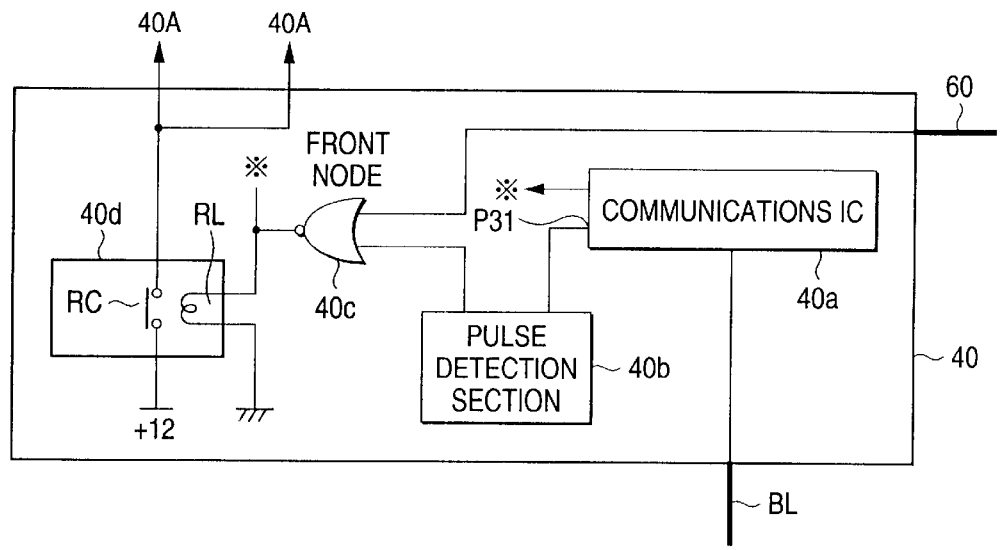
Figure 3C:
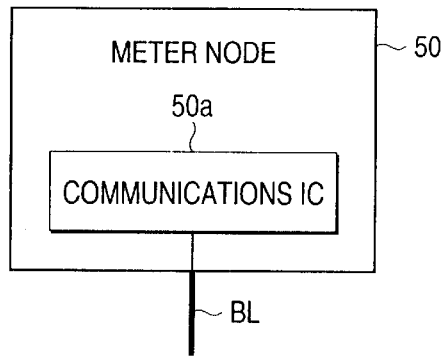

As shown in FIGS. 3A to 3C, the column node 30 incorporates only an IC 30a for slave communications use (hereinafter referred to as a "communications IC 30a"); the front node 40 incorporates an IC 40a for slave communications use (hereinafter referred to as a "communications IC 40a"); and the meter node 50 incorporates an IC 50a for slave communications use (hereinafter referred to as a "communications IC 50a"), none of which are provided with CPUs. Along with the IC 40a, the front node 40, which forms the output slave node B, comprises a pulse detection section 40b, a NOR gate 40c, and a relay section 40d. The pulse detection section 40b detects a detection pulse signal (hereinafter simply referred to as a "pulse signal") output from; e.g., a port pin P32 of the communications IC 40a, and retains its output level at a high level during a given period of time t3 during which the pulse signal is detected (which will be described later). When detection of the pulse signal is completed, the output level, which has been in a high level, is changed to a low level. For instance, the pulse detection section 40b comprises a retriggerable multivibrator. One input terminal of the NOR gate 40c is connected to the output terminal of the pulse detection section 40b. The other input terminal of the NOR gate 40c is connected to the control switch 30a connected to the column node 30 which acts as the input slave node A by way of the backup signal line 60 provided between the slave nodes 40 and 50. The relay 40d illuminates the headlamps 40A through activation of a relay contract RC by means of energization of a relay coil RL connected between the output terminal of the NOR gate 40c and the ground.

By means of the foregoing configuration, the cowl node 10 (which is the master node of the first master-slave sub-system) performs a polling operation. During the polling operation, the cowl node 10 periodically transmits, at a first given period of t0, a signal to the column node 30 and the front node 40 (both of which act as slave nodes) and in response receives data transmitted from the nodes 30 and 40. Further, the cowl node 10 also receives event data through event transmission which is automatically performed during intervals between routine cyclic transmission operations when there is a change in the signals input to the column node 30 and the front node 40.

Similarly, the door node 20 (which acts as the master node of the second master-slave sub-system) also performs a polling operation. During the polling operation, the door node 20 periodically transmits a signal to the meter node 50 (which acts as a slave node) at the given period of t0 (i.e., the same period used in the first sub-system) such that periodic transmission performed by the door node 20 differs in timing from that performed by the cowl node 10. Further, the door node 20 also receives event data through event transmission which is automatically performed when there is a change in the signal input to the meter node 50.

If the data collected in each of the master nodes are necessary for another sub-system, the data are transferred to the master node of another sub-system through communication between the master nodes. The thus-transferred data are further transmitted to the slave node that requires the data. In the event of a collision between event transmission operations or between event transmission and periodic transmission, by arbitration, transmission assigned a higher priority is performed in preference to another transmission assigned a lower priority. Upon completion of the high-priority transmission, the other transmission assigned a lower priority is resumed.

The cowl node (master node) 10 monitors the periodic transmission performed by the door node 20, whereas the door node (master node) 20 monitors the periodic transmission performed by the cowl node 10. If a certain master node is detected as having failed to perform the periodic transmission for a given period of time t1, which is slightly longer than the given cycle of t0; that is, if there is detected suspension of the periodic transmission which is performed at a given cycle of t0, the master node is determined to be unable to perform communication. As an alternative to the master node that has suspended the periodic transmission, the remaining master node periodically transmits a signal to the slaves that had received signals from the inoperative master node and in response receives data transmitted from the nodes. Further, the master node also receives event data from the slave nodes and transmits the thus-received event data to the slave node that requires the event data. The foregoing alternative periodic transmission is automatically performed when the periodic transmission is detected as not having been performed for the given period of time t1, and hence the alternative periodic transmission is performed at a cycle of t1.

The column node 30 and the front node 40 (both acting as slave nodes) usually exchange data by way of the cowl node 10 (acting as the master node). In the event of the cowl node 10 becoming unable to perform communication, the column node 30 and the front node 40 exchange data by way of the door node 20. However, if the door node 20 is also detected as having become unable to perform communication; namely, if suspension of the alternative periodic transmission which is performed at a given cycle of t1 is detected for a given period of time t2, which is slightly longer than the given time of t1, the column node 30 and the front node 30 periodically transmit signals to each other at a third given cycle of t2. The period transmission is automatically performed when suspension of periodic communication is detected as having continued for a given time period of t2.

When suspension of the periodic transmission performed at a given cycle of t2 is detected for a period longer than a given period of t3, which is slightly longer than the given period of t2, the front node 40 (which is the output slave node) determines the multiplex communications line BL to be inoperative and enables illumination of the headlamps 40A by the control switch 30A by way of the backup signal line 60.

More specifically, in the front node 40 shown in FIG. 3B, the pulse detection section 30b receives a pulse signal generated by a port pin P31 which is inverted every time the communications IC 40a performs a normal receiving operation. If no inverting pulse signal is received for a time period longer than the given period of t3, the pulse detection section 40b changes its output level, which has been held at a high level, to a low level. In the NOR gate 40c (acting as backup means) whose one input terminal receives the low level signal, when the control switch 30A is activated, the other input level of the NOR gate 40c is also changed to a low level, thereby outputting a high-level signal. When a high-level signal is output from the NOR gate 40c, an energization current flows to the relay coil RL, thus turning the relay contact RC on. As a result, an electric current flows to the relay contact RC from a 12-volt power source, thus illuminating the headlamps 40A.

Figure 4:
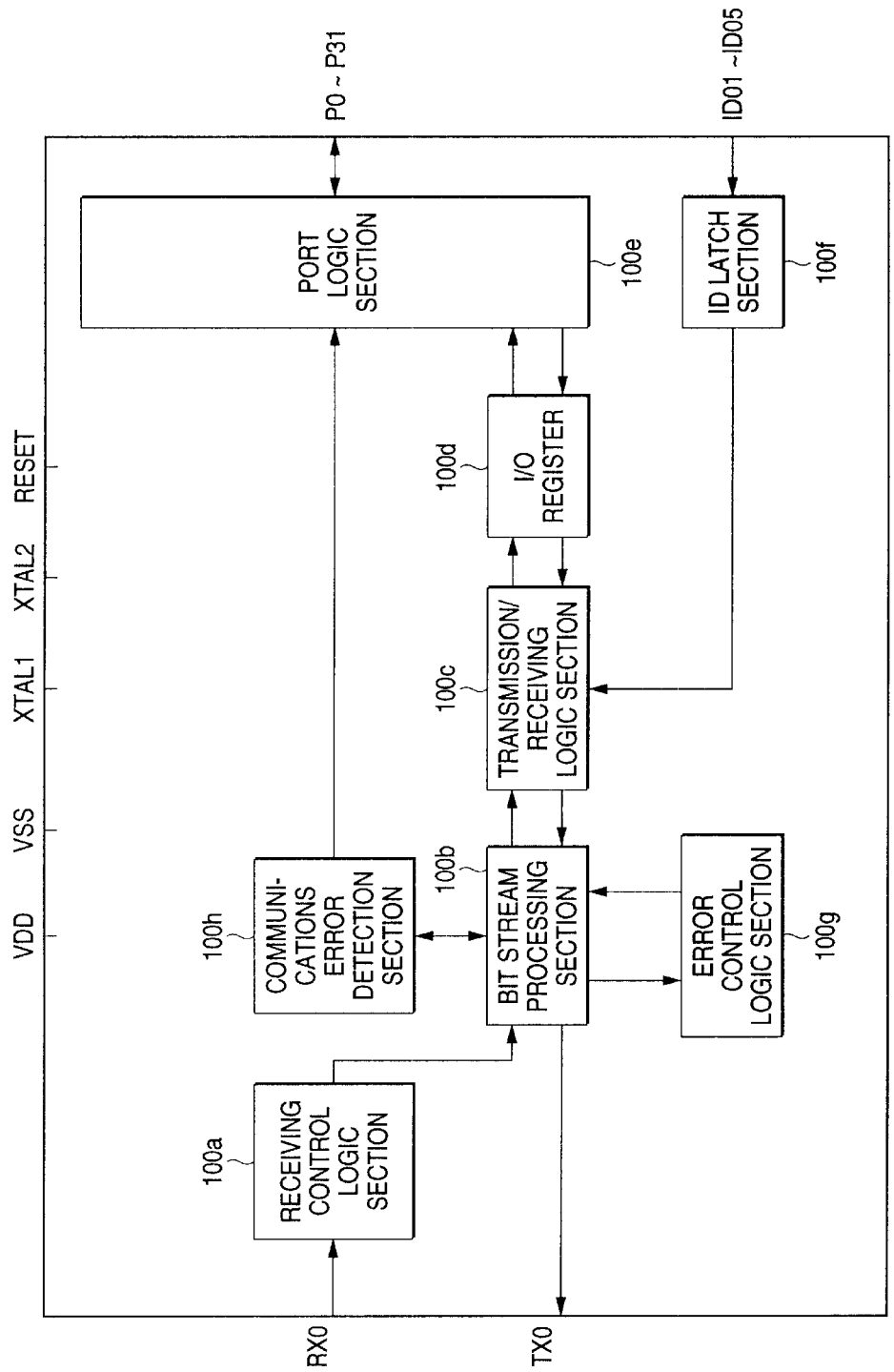
FIG. 4 is a block diagram schematically showing the configuration of a communications IC shown in FIG. 2 or 3.

Although the foregoing description has failed to refer to the specific configuration of the communications IC, all the built-in communications ICs of the nodes are identical in structure. The configuration of the communications IC will be described by reference to the communications IC 100 of the cowl node 10 serving as a representative of the communications ICs. As can be seen from a block diagram shown in FIG. 4, the communications IC 100 incorporates a receiving port pin RXO, a transmission port pin TXO, a power port pin VDD, a ground port pin VSS, transducer port pins XTAL1 and XTAL2, a reset port pin RESET, ID port pins ID01 to ID05, I/O port pins P0 to P31, a receiving control logic section 100a, a bit stream processing section 100b, a transmission/receiving logic section 100c, an I/O register 10d, a port logic section 100e, an ID latch section 100f, an error control logic section 100g, and a communication abnormality detection section 100h.

Upon receipt of an identification signal, the transmission/receiving logic section 100c compares the thus-received identification signal with that assigned to the communications IC 100. If a match exists between the identification signals, the transmission/receiving logic section 100c outputs the contents of the received message to a port. A message to be transmitted comprises information about details of register addresses received from the port logic section 100e, identification information, status information, and register address information. The bit stream processing section 100b continuously regulates data flow between the parallel data output from the transmission/receiving logic section 100c and the multiplex data received by a receiving section of the communications IC 100 and performs transmission/receiving operations, setting/clearing of a bit, arbitration operations, and error detection operations. The communication abnormality detection section 100h monitors the processing operation performed by the bit stream processing section 100b and detects whether or not the master node 10 normally receives the signal transmitted through periodic transmission. To this end, the communication abnormality detection section 100h has a built-in timer which counts time t0 to t3 (t0<t1<t2<t3). Every time the master node 10 receives a signal normally, the counter of the built-in timer is cleared. In other cases, the counter continues count-up operations and determines the communication of interest to be abnormal when the count exceeds a predetermined value. The communication abnormality detection section 100h also has a built-in inversion circuit (not shown) which is formed from, e.g., a flip-flop, and is inverted at time interval t4 at which the counter of the timer is cleared. A detection pulse signal which is output from the inversion circuit and includes H and L pulses is output to the pulse detection section 50a by way of the port pin P31. This error control logic section 100g is intended to manage errors.

An input or output terminal of the communications IC 10 can be set to the thirty-two I/O port pins P0 to P31 by means of the master node 10.

In a case where the port pins P0 to P31 are set as an input terminal of the communications IC 100, high and low input levels of the port pins P0 to P31 are transmitted to the master node 10 by the following two methods. First, in response to a transmission request transmitted from the master node 10 in the form of a data frame; i.e., a response to polling, a data frame is transmitted. In an edge trigger mode, upon detection of a leading edge or a trailing edge in the pulse input to the port pins, the communications IC 100 transmits event data in the form of a data frame.

In a case where the port pins P0 to P31 are set as an output terminal of the communications IC 100, the master node 10 sets a data output register. Only the number of bits equal to the number of 1s set in an output enable register are output to the port pins P0 to P31.

The I/O register 100d has a map such as that shown in FIG. 5. Each of addresses 0 to 9 comprises 16 bits. A data I/O 1 register is formed in address 0; a data I/O 2 register is formed in address 1; an event stop 1 register is formed in address 2; an event stop 2 register is formed in address 3; a priority bit register is formed in address 4; an output enable 1 register is formed in address 5; an output enable 2 register is formed in address 6; a filtering time register is formed in address 7; a wake-up register is formed in address 8; and a fail-safe mode register is formed in address 9.

The data input register 1 (located at address 0) and the data input register 2 (located at address 1) are read-only registers. Inputs to the data input registers 1 and 2 are set and supplied in an event capture mode. With regard to a port whose event stop register is 0, event data are automatically transmitted when the input level of the port is changed by one (event transmission). Each of the data input registers 1 and 2 is assigned the status of the ports P0 to P31. However, the number of values capable of being set in each of these register corresponds to only 16 bits. Therefore, the ports are divided into two groups, thereby enabling assignment of the input levels of the ports to the respective registers. When a change in one of the ports set in the data input registers 1 and 2 is detected through detection of an edge, a synchronized message is transmitted subsequent to a control field read in a transmission buffer. Thus, a transmission message is prepared so as to lag behind the receipt of an input signal. If the input port receives another input signal during a time period between transfer of input data to the register and detection of a change in the input level of the input port, the portion of the input data whose register bits match those of the current input port are written over the current input port.

Further, the data output register 1 (located at address 0) and the data output register 2 (located at address 1) are write-only registers and are given the data output from the port pins P0 to P31. Output drivers of the respective port pins P0 to P31 are designated on a per-bit basis through output enabling. When communication is successful, new data are written directly into the output ports.

The event stopper register 1 (located at address 2) and the event stopper register 2 (located at address 3) capture events input to the individual port pins. Transmission of an event on a per-bit basis, which would otherwise be caused when a change arises in the input level of the port, can be suspended by setting 1 to the event stop registers 1 and 2. The rewritable priority bit register (located at address 4) captures an event on a per-port basis. The data transmitted to any one of the port pins P0 to P5 can be transmitted over the bus line while the priority assigned to the data is increased, by setting 1 to address 4 of corresponding port pin among the port pins P0 to P5.

The output enable 1 register (located at address 5) and the output enable 2 register (located at address 6) are rewritable registers and set the output drivers of the individual port pins. When 1 is set to the output enable registers 1 and 2, transmission data are output to the output drivers. When 0 is set to the output enable registers 1 and 2, transmission data are not output to the output drivers.

The filtering time register (located at address 7) is for defining a filtering time by changing a scaling factor with respect to a reference time. The wake-up register (located at address 8) transmits first the contents of the data stored in the address of this register as a wake-up frame when the communications IC 100 is activated from a sleep state. The fail-safe mode register (located at address 9) determines whether or not communication established by the communications IC 100 is good, through periodic polling performed by the master node 10. If the periodic polling is stopped, the fail-safe mode register determines that an abnormality in communication has arisen. At this time, in order to bring peripheral circuits disposed around the communications IC 100 into a fail-safe mode, a frame including the information about the fail-safe mode register is usually transmitted as a communication abnormality signal.

The processing performed by the communications IC 100 is determined by eleven types of frames ID0 to ID10 of standard formats, such as those shown in FIG. 6A. Transmission and receiving operations are performed separately by means of two identification signals. In the drawing, in the case of transmission data, 1 is set in DIR of the bit ID0. In the case of received data, 0 is set in the same, thereby enabling ascertaining of the direction in which data are transmitted. ID01 to ID05 of bits ID1 to ID5 are used for assigning source addresses for the purpose of identifying the slave node and enable identification of a maximum of 32 slave nodes. MA01 to MA03 of bits ID6 to ID8 are used for assigning master addresses for the purpose of identifying the master nodes and enable identification of a maximum of 8 master nodes. M-S of bit ID9 is set to 1 at the time of master-node-to-master-node communication; i.e., communication between the master nodes forming master-slave subsystems, and to 0 at the time of master-node-to-slave-node communication. Priority in bit ID10 is set when higher-priority data are transmitted by arbitration. The bits ID0 to ID10 form an arbitration field headed by a frame start (SOF) and ending with a transmission request (RTR).

As shown in FIGS. 6B and 6C, the arbitration field is followed by a control field including a data length code and 3-byte data frames. These 3-byte data frames are collectively transmitted by the communications IC 100. A first data byte comprises status information, such as REMOTE, EW, BM, and sleep, and register address A0 to A3. At the time of low-current dissipation mode, 1 is set in the sleep status under control of the master slave 10. By means of the register address A0 to A3, the data I/O 1 register, the data I/O 2 register, the event stop 1 register, the event stop 2 register, the priority bit register, the output enable 1 register, the output enable 2 register, the priority bit register, the output enable 1 register, and the output enable 2 register are specified.

In the transmission frame to be transmitted by the master node during polling; i.e., a receiving data frame received by the communications IC, 1 is set in REMOTE bit of the status bit of the first data byte. Upon receipt of the data frame the communications IC 100 determines that a transmission request has been issued and returns an acknowledgement. Whether or not other master nodes normally perform periodic transmission can be ascertained by the master node 10 monitoring 1 set in the REMOTE bit. The communications IC transmits a data frame while the data frame includes new contents of the information about the I/O register addresses, the master slave can ascertain that the communications IC has received the data frame. This return data frame includes a data length code (DLC=3).

The second data byte includes I/O register data (P8 to P15 and P24 to P31), and I/O register data (P0 to P7 and P16 to P23) are included in the third data byte.

The status includes remote and sleep statuses. By setting 1 to the remote status, the slave node returns port data upon receipt of the data frame through normal operation from the master node.

When the communications IC detect a communication error in the master node due to failures or loss, the multiplex communications system enter a fail-safe mode to thereby ensure the minimum functions by commencing local communication among the communications ICs. In this fail-safe mode, when a communication error is detected, a slight change is made to the arbitration field of the data frame. As a result, even if the master node is broken or lost, data can be exchanged between two different nodes whose top four bits are identical and which differ in only the least significant bit from each other.

As shown in FIG. 7A, at the time of transmission from the master node to the slave node normal operating conditions, 0 is set to M-S and DIR of the arbitration field. Further, as shown in FIG. 7B, at the of transmission from the slave node to the master node, 0 is set to MOS and 1 is set o DIR. However, a communication error arising in the master node is detected from suspension of a polling operation, the arbitration field of the transmission frame is changed so that another slave node can receive the transmission frame. More specifically, as shown in FIG. 7C, two bits; i.e., ID00 and DIR, are inverted at the time of communication between the slave nodes. The thus-modified transmission frame is identical with a transmission frame which is used for transmission from the master node to the slave node and in which only ID00 bit of all the ID bits is inverted. More specifically, the thus-modified transmission frame is received by the slave node having the same ID bits; namely, the slave node whose ID00 bit being inverted. Therefore, communication can be established between the slave node having an ID "xxxx0" and the slave node having an ID "xxxx1." As a matter of course, the two slave nodes must be identical in the remaining bits "xxxx."

There is given an explanation of the data field in the event of occurrence of a communication error. An ID "xxxx0" represents event transmission of only 16 bits from the port 0; and an ID "xxxx1" represents outputting of 16-bit received data to the port 0. Similarly, an ID "xxxx1" represents event transmission of only 16 bits from the port 1; and an ID "xxxx0" represents outputting of 16-bit received data to the port 1. Thus, interference between input data and output data is prevented. If the I/O register address is set to another address which is different from an ordinary I/O register address and is specifically designated for use in abnormal transmission; i.e., the register address 9 in the fail-safe mode, the receiving nodes can perceive that the transmission frame is a slave-to-slave communication frame used in the event of occurrence of an abnormality. More specifically, in the fail-safe mode, each of the nodes uses the register address 9 as a data input register or a data output register.

There will now be described of receipt of a communications frame used in slave-to-node communication. Upon receipt of slave-to-slave communication frame, each slave node enter a fail-safe mode. If the ID is "xxxx0," the slave node authorizes an event input to the port 0 but prohibits an output from the port 0. Further, the node authorizes an output from the port 1 but prohibits an event input to the port 1. Similarly, the ID is "xxxx1," the slave node authorizes an event input to the port 1 but prohibits an output from the port 1. Further, the salve node authorizes an output from the port 0 but prohibits an event input into the port 0. The slave node is maintained in the fail-safe mode until a normal frame (periodic transmission) is received from the master node. When a normal frame is received from the master node, the status of each of the slave ports is set to a preset state (i.e., a preset value of the slave port immediately before the slave port enters a fail-safe mode). More specifically, the register address of the slave port is reset 0 or 1.

In the foregoing embodiment, the multiplex communication system comprises the first master-slave sub-system and the second master-slave sub-system. The first master-slave sub-system comprises the cowl node (master node) 10, the column node (slave node) 30, and the front node (slave node) 40, all of which are connected to the multiplex communications line BL. The second master-slave sub-system comprises the door node (master node) 20 and the meter node (slave node) 50, both of which are connected to the multiplex communications line BL. The cowl node 10 periodically transmits a signal to the column node 30 and the front node 40 at the first regular cycle of t0. The cowl node 10 establishes communication between the column node 30 and the front node 40 by way of the multiplex communications line BL, thereby causing data exchange between the column node 30 and the front node 40. Similarly, the door node 20 periodically transmits a signal to the meter node 50 at the first regular cycle of t0. The door node 20 periodically transmits a signal to the meter node 50 at the first given cycle of t0 by way of the multiplex communications line BL to thereby establish communication between the door node 20 and the meter node 50 by way of the multiplex communications line BL. As a result, data are exchanged between the door node 20 and the meter node 50.

The cowl node 10 and the door node 20 monitor each other. When it is detected that the periodic transmission, which is performed at the first given cycle of t0, is not correctly carried out, the master node, which is in a normal operating mode, periodically transmits a signal to the slave nodes of both the master-slave sub-systems at second given cycle of t1, which are slightly longer than the first given cycle of t0. Further, when it is detected that periodic transmission between two specific slave nodes; i.e., periodic transmission between the column node 30 and the front node 40, which would otherwise be performed at the second given cycle, is not correctly carried out, periodic transmission between the two slave nodes is resumed at third given cycle of t2, which is slightly longer than the second given cycle of t1.

Thus, the level of communication can be reduced stepwise according to the degree of malfunction, and an optimum backup operation can be carried out according to the degree of malfunction.

Further, even if a break arises in the multiplex communications line BL to such an extent as to disable communication between the salve nodes, the minimum load can be driven by way of the backup signal line 60 directly laid between the slave nodes, thereby ensuring minimum operations required for avoiding hazard.

As has been described above, according to the first aspect of the present invention, even if a master node falls into malfunction, another master node can control the slave nodes as an alternative to the inoperative master node. Further, even if all the master nodes of the master-slave sub-systems fall into malfunction, communication between two specific slave nodes is ensured. Consequently, the control means connected to one of the slave nodes can drive the load connected to the other slave node, thus enabling an optimum backup operation corresponding to the degree of malfunction.

According to the second aspect of the present invention, even if communication between the slave node connected to the control means and the slave node connected to a load cannot be established by way of the multiplex communications line, minimum functions can be automatically ensured.

What is claimed is:

1. A multiplex communications system, comprising:
   a first master-slave sub-system including one master node connected to a multiplex communications line and at least one slave node connected to the multiplex communications line and a second master-slave sub-system including one master node and a plurality of slave nodes connected to the multiplex communications line, wherein
   the master nodes of the master-slave sub-systems periodically transmit signals to the associated slave nodes of the respective sub-systems at a first given cycle;
   the slave nodes respectively transmit signals in response to periodic transmission of the signals from the master nodes, thereby establishing communication between the master nodes and the associated slave nodes through the multiplex communications line and exchanging data between the slave nodes;
   the master node of the first master-slave sub-system monitors the master node of the second master-slave sub-system, and detects when periodic transmission of a signal at the first given cycle is incorrectly carried out by the second master-slave sub-system, wherein when the master node of the first master-slave sub-system detects that the periodic transmission of the signal at the first given cycle of the second master-slave sub-system is incorrectly carried out, the master node of the first sub-system, which correctly performs periodic transmission of a signal, periodically transmits a signal to the slave node of the first sub-system to which the master node belongs and to the plurality of slave nodes of the second sub-system at a second given cycle which is slightly longer than the first given cycle; and when it is detected that periodic transmission of the signal at the second given cycle is incorrectly carried out, periodic transmission of a signal at a third given cycle, which is slightly longer than the second given cycle, is performed between the plurality of slave nodes of the second sub-system in response to detection in that the periodic transmission of the signal at the second given cycle is incorrectly carried out.

2. The multiplex communications system of claim 1, further comprising a backup signal line interconnecting the plurality of slave nodes of the second sub-system, one of the plurality of slave nodes being an input slave node connected to control means and the other of said plurality of slave nodes being an output slave node connected to a load, wherein the output slave node comprises:

abnormality detection means which detects an abnormality when the output slave node does not receive a transmission signal for a given time period slightly longer than the third given cycle; and backup means which enables the control means to drive the load through the backup signal line in response to detection of an abnormality by the abnormality detection means.

* * * * *